June 8, 1965 G. A. FEDDE 3,188,613

THIN FILM SEARCH MEMORY

Filed July 25, 1962 2 Sheets-Sheet 1

INVENTOR
GEORGE A. FEDDE

BY David Teacher

ATTORNEY

United States Patent Office 3,188,613
Patented June 8, 1965

3,188,613

THIN FILM SEARCH MEMORY

George A. Fedde, Norristown, Pa., assignor to Sperry Rand Corporation, New York, N.Y., a corporation of Delaware Filed July 25, 1962, Ser. No. 212,310
20 Claims. (Cl. 340—174)

This invention relates generally to magnetic apparatus for the storage of binary information and more specifically to novel forms of thin film information storage device, the contents of which may be sensed without destroying said contents.

In very recent years considerable attention has been focused on the use of thin ferro-magnetic films as memory and switching elements in digital data processing equipment. The chief advantages of these thin films lies in their improved properties when compared to the more bulky toroidal type ferro-magnetic cores presently in common use. These improvements being, among others, higher switching rates, lower drive requirements, a higher degree of squareness in its hysteresis loop, and zero magneto-strictive effect.

In the Sydney M. Rubens Patent No. 2,900,282, there is disclosed and claimed a method of preparing thin ferro-magnetic films having the above-mentioned properties by means of a vacuum deposition of a magnetic alloy on a suitable supporting substrate in the presence of an orienting magnetic field. Films prepared according to the teachings of that patent have a single preferred or so-called "easy" axis of magnetization which is aligned with the axis of the orienting field used during the deposition process. It is to be understood that other methods are available for depositing a thin magnetic film, for example, ferro-decomposition or electro-deposition and limitation to vacuum deposited films as the magnetic films used in this invention is not intended. It is intended, however, that no matter what means are employed to prepare the film element, the resulting product should have at least one preferred axis of magnetization.

In Patent No. 3,015,807 for a Non-Destructive Sensing of a Magnetic Core by Arthur V. Pohm et al. there is taught an organization of magnetic film pairs which may be employed to store binary information and which may be sensed to determine the contents of the core without destroying the information stored therein. The device operates to store binary information by placing the remanent magnetization of one of the films in the above-mentioned film pair, called the memory film, in one or the other of its two stable states. One stable state corresponds to a one, while the other stable state corresponds to the binary zero. The other film, called the readout film, is oriented with its easy magnetization direction at right angles to the memory film, so that the external field of the memory, acts as a transverse field upon the readout film. Reading is accomplished by the application of a sequence of external field pulses which are sufficient to reverse and to restore to its original state the magnetization of the readout film, when the memory film magnetization is in one of its remanent states, or which are insufficient to do so when the memory film is in the other of its remanent states.

The present invention utilizes a device which is similar in many details to that described with reference to the Pohm et al. patent but which differs in the following manner. In the instant application, however, the direction of easy magnetization of the readout film is made to be along the line of direction of the easy axis of the memory film, but anti-parallel to it. Thus regardless of which of the two stable conditions the memory film is placed in, the readout film will always be along the same line but anti-parallel. As a result of the respective orientations of the memory and readout films, and of the characteristics of the materials which compose the respective films, the memory film will always return the readout film to the static position from which it was disturbed by the effects of externally applied fields. Hence, no additional apparatus need be provided to restore the readout film after the contents of the storage device has been sensed. Thus permits a reduction, as well, in the number of film members which must be provided for the storage device.

More specifically, the memory element includes a pair of films each of which has the physical properties which may be identical to those of the Pohm patent with the exception of the orientation of easy axis of the respective films. The first film, termed the memory film, is used to store a bit of information by placing it in one or the other of its remanent states. The second film of each film pair, termed the readout film is oriented so that the preferred axis thereof (along which the readout film's remanent magnetization lies in its unbiased state), is parallel with that of the memory core. Furthermore, the memory film has an external field produced by the remanent magnetization thereof which biases the magnetization of its associated readout film relatively strongly, while the external field of the readout core has a relatively weak influence on the remanent magnetization of its associated memory film. A first interrogation or drive line (also a film) is inductively coupled to each of said memory and readout films. Actuation of this interrogation line will produce a transverse magnetic field which will act upon the remanent magnetization of the readout film in a manner to be described. A second interrogation or drive line (also a film) is associated with and inductively coupled to the respective memory and readout films. Upon proper actuation of this interrogate line a longitudinal field will be established, which field will act in one direction or another upon the remanent magnetization of the readout film, depending upon the polarity of the actuation signal. The manner in which the fields created by the second interrogate line operate upon the readout film will be set forth in detail below. Finally, a sense winding is providing for each of the films, that is memory and readout, and inductively coupled thereto. Signals will be produced upon the sense windings according to the effects of said applied fields upon the remanent magnetization of said readout film. The direction of the magnetization of the readout film will be left unaltered or changed depending upon whether the film stores an information bit which is the same as that sought for or not.

In storing a first type of information the remanent magnetization of the memory film is made to lie along its easy axis, whereas the remanent magnetization of the readout film is made to be anti-parallel to that of the memory film. In storing a second type of information the remanent magnetization of the memory film is made to lie anti-parallel to its easy axis, while the remanent magnetization of the readout film is made to lie along its easy axis, which is parallel with the easy axis of the memory film. The subsequent introduction of a field, caused by a signal along the first interrogate or drive line, causes the remanent magnetization of the readout film to be rotated a small distance from its original position in a direction parallel to the field. The application of a signal to the second interrogate or drive line, during the application period of the signal to the first interrogate, causes further changes in the remanent magnetization of said readout film depending upon the original direction of the remanent magnetization of the readout film and the polarity of the signal applied to the second interrogate line. These changes will be (1) a small rotation of the remanent magnetization in a direction parallel to the original remanent state or (2) a large rotation in a direction anti-parallel to the original remanent state. Broadly stated, the small rotation, and a resulting small output signal, will occur whenever the remanent state of the readout film and the field caused by the signal on the second interrogate line are parallel. This is to say that the stored value and the incoming signal match. The large rotation, and a resulting large output signal, will occur whenever the remanent state of the readout film and the field caused by the signal on the second interrogate line are anti-parallel. That is, the stored value and the incoming signal do not match or there is a mismatch. Thus, the memory element may be sensed to determine whether or not it stores a value similar to that sought.

After the sensing operation has been completed and the signals are removed from the first and second interrogate lines, the only fields remaining are those caused by the remanent magnetic states of the films themselves. As stated above the readout film has little or no effect on the remanent state of the memory film. However, the memory film has a strong effect on the readout film and will rotate the remanent magnetization of the readout film back to its original position, that is the position before the application of any external field. It should be noted that the pulses caused by this resettling is equal and opposite to the value of the pulse produced during the original switching and detected by the sense lines. These signals are not employed for purposes of this invention and may be disregarded or eliminated by well known means.

To summarize the output signals on the sense lines: A small signal, ideally zero will be produced in the case where a match exists. This signal may be eliminated by proper external components. A large signal will be produced in the case where a mismatch exists, which signal can easily be detected by output detectors.

The above described memory element finds its greatest utility in the so-called search memories, which permit simplified examination of the contents of a memory to determine its contents. In conventional magnetic memories of the prior art, the contents of the memory may only be interrogated in a serial manner. That is to say, when searching such memories for a word of information stored therein and having an unknown memory location, each storage register in that memory must be addressed in a sequential fashion. The addressing countinues until a comparison is achieved between the word which is sought (used as the first comparison value) and the word as read from the stored information. Thus, in addition to the circuitry required for the memory itself, there is required additional circuitry to provide the necessary addressing of each discrete word register or location within the memory. Also a comparison device and register, by which the first comparison value may be stored and compared with the information as read from the memory, is required. By properly utilizing the unique properties of the above described thin film memory element, it is possible to simultaneously search all storage registers in the memory for the desired information, without the necessity of such additional addressing and comparison devices.

A plurality of the memory elements, constructed in accordance with the principles of the invention are arranged in a plurality of rows and columns, thereby forming a two or three dimensional matrix. Information is stored in groups of these memory elements, called word registers, as described above. The first interrogation or drive lines of each of the memory elements which constitute a word register are connected in series, and upon proper actuation applies a common transverse or word field to each of the memory elements so connected. The second interrogation or drive lines of each memory element located in a single row, which constitute the same bit order are connected in series and upon proper actuation applies a common longitudinal or bit field to the elements so connected. Further, the sense lines of each of the elements in a word register are connected in series to produce a signal indicative of the total match or mismatch between the stored values and those applied to the bit lines.

In operation the word sought for is set up to apply signals to the various bit lines of the matrix. The polarity of the signal applied will depend upon the digit in that bit position. For example, a one in the bit order might be represented as a positive polarity signal, whereas the zero would be a negative polarity signal. However, prior to the application of the bit field, a word field would be applied to all of the word lines. This signal would continue during the entire period the bit field is applied. As a result of these fields, the remanent magnetic states of the readout films would be changed as described above. Signals would be available on all the sense lines where mismatches had occurred anywhere within the word register. The level of this signal will depend upon the number of mismatches which occur. However, the mismatch of only one memory element will be sufficient to produce a satisfactory signal. In the case where a match has occurred between the word used for comparison and the stored word, no signal is produced, indicating the match condition. After the fields are removed from the word and bit lines, the memory elements are returned to their original conditions of storage ready to be interrogated again.

It is therefore the primary object of this invention to provide a magnetic film disposed anti-parallel with another film as to their remanent magnetization axis so that the latter film will induce a longitudinal field in the former film whereby the former film will return to its original axis of remanent magnetization after being displaced by a sensing thereof.

It is another object of this invention to provide a memory element which may be sensed without the destruction of the information stored within such element, and which may be reset to its original storage value without the application of additional external fields.

It is still another object of this invention to provide a memory element, composed of a memory film and a readout film, the remanent magnetization of said readout film being rotated from its original storage position as a result of the application of a transverse and a longitudinal field to produce a signal indicative of a match or mismatch between the original storage value and the longitudinal field, said readout film being returned to its original storage position upon the termination of the transverse and longitudinal fields by the interaction of the field created by the memory film with said readout film.

It is a further object of this invention to provide a search memory employing memory elements, each composed of a memory film and a readout film, the remanent magnetization of said readout film being rotated from its original storage position as a result of the application of a transverse and a longitudinal field to produce a signal indicative of a match or mismatch between the original storage value and the longitudinal field, said readout film being returned to its original storage position upon the termination of the transverse and longitudinal fields by the interaction of the field created by the memory film with said readout film.

Another object of this invention is to provide a magnetic memory having a non-destructive, simultaneous search capability.

A further object of this invention is to provide a search memory utilizing data biasing techniques to obtain parallel sensing of all the word registers in the memory.

Still another object of this invention is to provide a search memory utilizing data biasing techniques to obtain parallel sensing of all the word registers or identical portions thereof in the memory.

It is a further object of this invention to provide a magnetic core memory wherein data may be readily removed without the necessity for special addressing and comparison circuits.

It is further an object of this invention to provide a search memory which is simple to construct and easy to operate.

It is a further object of this invention to provide a memory which has the capability of non-destructive readout and which employs thin film techniques.

Other objects and features of the invention will be pointed out in the following description and claims and illustrated in the accompanying drawings, which disclose, by way of example, the principle of the invention, and the best mode which has been contemplated for carrying it out.

Figure 3A:
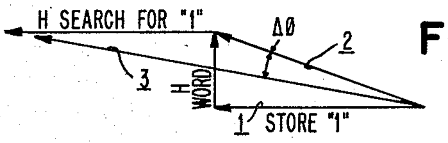
Figure 3B:
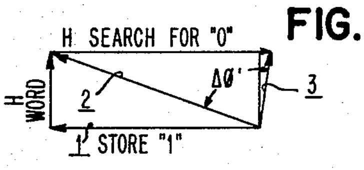
Figure 4:
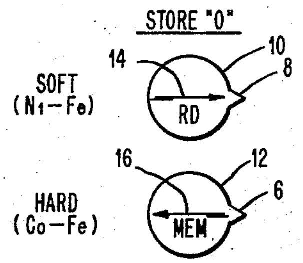
Figure 5A:
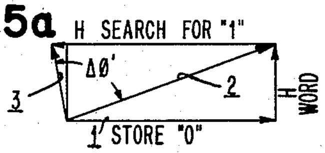
Figure 5B:
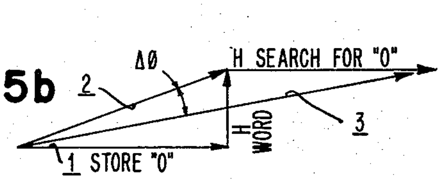
Figure 6:
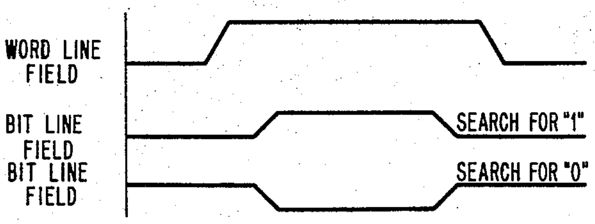
Figure 7:
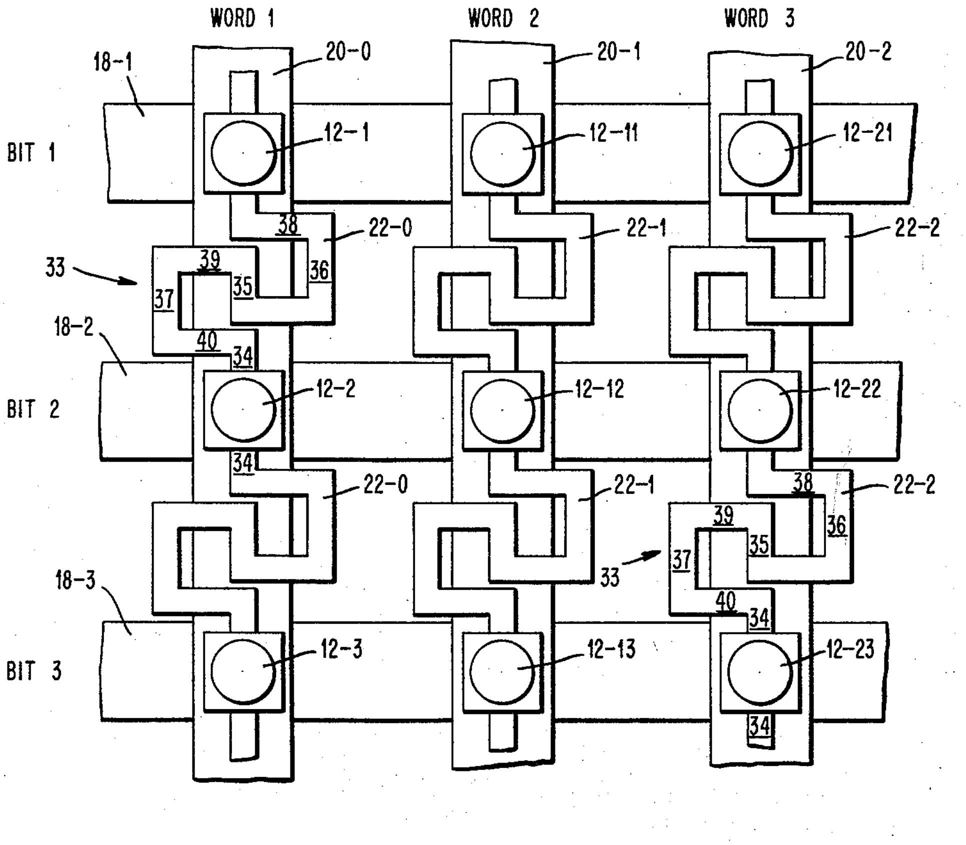
Figure 8A:
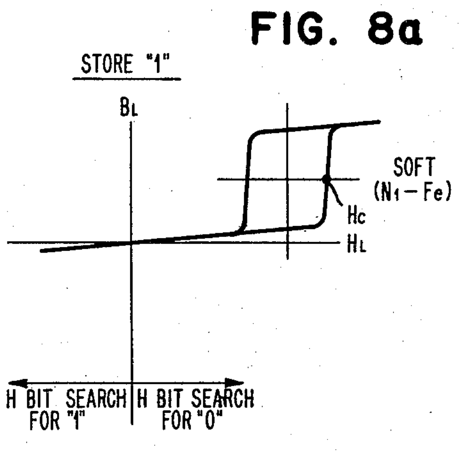
Figure 8B:
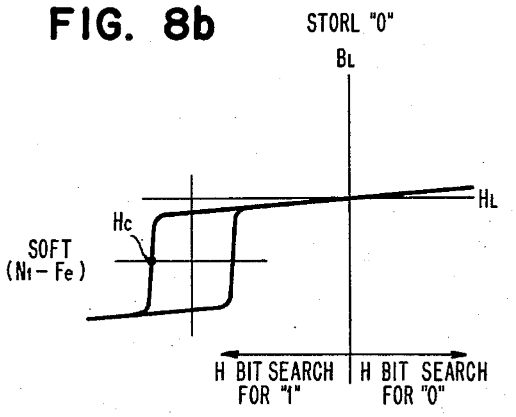

FIGURES 3*a* and 3*b* diagrammatically illustrate the magnetic vectors of the fields applied through the respective films of the device and the resulting magnetization vector positions;

FIGURE 4 illustrates the position of the magnetization vectors of the various films when the device is storing a zero;

FIGURES 5*a* and 5*b* illustrate the various applied magnetization fields and the resulting magnetization vectors;

FIGURE 6 illustrates the relative sequence of application of the word line field and bit-line field to the device of the instant invention;

FIGURE 7 illustrates a matrix composed of elements constructed in accordance with the instant invention;

FIGURES 8*a* and 8*b* illustrate in diagrammatic form the manner of operation of a further embodiment of the device of the instant invention.

Similar elements are given similar reference characters in each of the several drawings.

Figure 1:
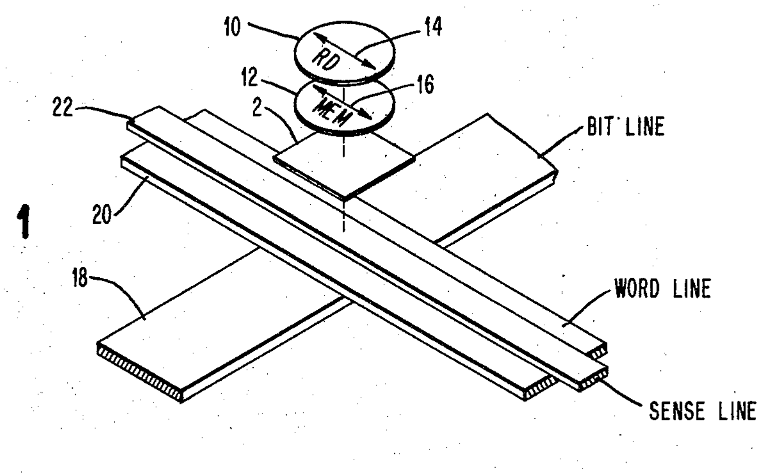
FIGURE 1 is a diagrammatic representation of a device constructed in accordance with the basic concepts of this invention.

In FIGURE 1 there is shown, in an exploded view, a magnetic storage element composed of a pair of binary magnetic films 10 and 12. Cores 10 and 12 are thin magnetic films preferably of the uni-axial, anisotropic type, each having a single preferred or "easy" axis of magnetization, along which the remanent magnetization thereof lies in either of two opposite directions representing two stable states. The film, further exhibits a difficult or hard axis transverse to the easy axis. Film 10 is termed the readout film (also referred to as RD) and film 12, the memory film (also referred to as MEM). The abovementioned preferred axes of films 10 and 12 are respectively indicated by the vectors 14 and 16. The films are oriented such that the preferred axis of one is parallel with the preferred axis of the other. Furthermore, film 12 has the property that the external field caused by the remanent magnetization thereof influences the magnetization of the film 10 relatively strongly while the external field of the film 10 caused by the relative magnetization thereof influences the magnetization of the film 12 relatively weakly. In other words, the field set up by the remanent magnetization of the film 12 may bias the remanent magnetization of the film 10. This is due to the formation of the memory film from a material such as cobalt and iron for example, which material has a relatively high value of $H_c$ and $H_k$, as compared to the readout film which is composed of nickel and iron for example. The nickel and iron film possess relatively low values of $H_c$ and $H_k$, in the range of one-fourth to one-eighth of that of the cobalt-iron film. The cobalt-iron film may be referred to as a hard film, meaning that greater coercive forces are necessary to changes its remanent magnetic state, whereas the nickel-iron film may be referred to as a soft film, that is requiring a lesser coercive force to cause it to change its remanent magnetic state.

A first drive line 18 is physically oriented perpendicular to the preferred axis 16 of the memory core, to provide a field which is parallel to the illustrated vector 16 of the memory element, as well as the vector 14 of the readout element 10. This drive line 18, also known as the bit line, may be pulsed by current pulses of either polarity to cause the establishment of longitudinal bit fields which lie along the easy axis of the readout and memory films, and have a direction of zero or 180° relative to the vectors 14 and 16.

A further drive line 20, designated the word line, is arranged in a direction parallel with the easy axis of the film 10 and 12 and perpendicular to the bit line 18. When properly actuated, as will be described below, a transverse word field is established which is perpendicular to the direction indicated by the vectors 14 and 16, indicating the easy axis of the respective films 10 and 12. Further, a sense winding 22, is also physically oriented in a direction parallel with the easy axis of the films 10 and 12 and in parallel relationship with the word line 20.

Figure 2:
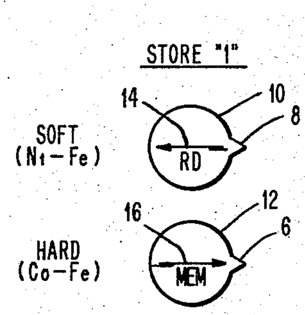
FIGURE 2 illustrates the orientation of the magnetization vectors for the respective films when storing a binary one.

The manner of operation of the device of FIGURE 1 will now be set forth with reference to FIGURES 2 through 5. Referring to FIGURE 2 there is shown the orientations of the magnetization vectors for the films 10 and 12. As can be seen from the figure, each of the films 10 and 12 has a small arrowhead designated 8 and 6, respectively, which is indicative of the direction of the easy axis of magnetization for the individual core. It is evident from the manner of placement of arrowheads that the easy axis of both the cores 10 and 12 are parallel. When used to store a one the memory film vector 16 is made to lie in the easy axis direction, i.e., in the direction of the arrowhead 6 whereas the magnetization vector for the readout film 10 is made to lie along the easy axis but rotated 180° from the direction indicated by the arrow 6. Closed flux paths will be established between the two cores in such a manner as to run from the head of the vector 16 of the memory core 12 to the tail of the vector 14 of the readout core 10 and then from the head of the vector 14 to the tail of the vector 16 to complete the circle. Thus, without the addition of external forces attempting to disrupt the indicated vector positions the field of the memory will attempt to preserve the orientation of the readout core in the direction shown.

Referring now to FIGURE 3, the magnetization vector of the readout core 10 is shown along the position indicated as $\underline{1}$. This is the position which it will normally occupy when at rest, that is with no external forces other than that from the memory core 12. Upon the application of a current pulse to a word line 20 in the direction from the left of the diagram (FIG. 1) toward the right (the manner in which the word line is usually pulsed) a transverse word field will be established which is perpendicular to the direction indicated for the vectors 14 and 16 and tending to displace the vector position as shown for the readout element 14 of FIGURE 2. This is illustrated in the FIGURE 3*a*, as a vector indicative of the word field acting in a direction perpendicular to the vector direction of the stored one of the field of the core 10 and labelled H word in the FIGURE 3*a*. As a result of the operation of the H word, that is, the transverse field, the magnetization of the readout film will be rotated to take up a new position indicated at 2 which represents a partial rotation of the stored one vector to a position toward the direction of the word field. The value of the field established in the readout core by the word line, is insufficient to cause the rotation of the vector 14 to a position parallel with the field of the word line.

Next the bit line 18 is pulsed with a so-called search pulse which may be a positive pulse (search for a stored "1") or a negative pulse (search for a stored "0"). It should be recalled from the discussion above that the memory element can be sensed to determine its contents, and that it can be checked specifically to determine whether a one or a zero is stored within it. The presence or absence of the type of signal stored will be shown by the match or mismatch signals generated in response to interrogate pulses of either polarity depending upon the value searched for. Thus, if it is desired to see if the memory element stores a one a positive pulse will be applied etc. In the case of the search memory, the word sought is set up on the respective bit lines of the word registers, thus applying a pulse pattern which corresponds to the bits of the input word which will be sought in the memory. As can be seen from FIGURE 6, the word line field is established before the bit line field (regardless of whether it is a positive or negative bit field) and ceases after the bit line has ceased. It should also be noticed that the positive and negative bit search lines are applied at the same time. This is of no significance to an individual memory element in that only one field, depending upon the value sought is applied. The concurrent application of the bit fields is significant with respect to the search memory in which all the bit lines are actuated simultaneously and with a field dependent upon the value sought. Referring again to FIGURE 3*a*, the application of a current pulse to the bit line 18 (FIG. 1) will cause the establishment of a field along the axis of the vectors 14 and 16 and perpendicular to the bit line 18, itself. As a result of the application of the field of the search for one, which is shown as a vector lying to the left of resultant vector 2 of FIGURE 3*a*, a new resultant vector indicated as 3, is shown, which illustrates the resulting position of the original storage vector of the readout element as a result of the application concurrently of the word field and the search for one bit field. As can be seen from the position of this vector no great change of position has resulted from the application of the word field or bit field and that the vector indicative of the stored one lies in a position close to that originally occupied. As a result of this small change of position, indicated by the angle $\Delta\phi$ a very small signal approximating zero is generated to indicate the fact that the value stored is in agreement or matches the value which is being searched for. FIGURE 3*b* illustrates the reverse of this situation, that is, the condition where the value being searched for is different or mismatches the condition stored in the readout core at the time. The resulting vector 2, shown in FIGURE 3*b*, occupies a position similar to that of the resulting vector 2 of FIGURE 3*a* in that the same fields operate to establish this new position 2, namely the value of the vector indicative of the stored one and the value of the field applied by the word line. However, upon searching for a zero, a vector field is established which is now of the same magnitude and lying along the same line as that shown in FIGURE 3*a*, but 180° displaced from that shown in FIGURE 3*a*. Thus, the resulting vector position 3, indicative of the resultant remanent magnetization due to the stored value, the word field and the search for zero bit field is a vector position which is rotated a great angle $\Delta\phi$ from the position originally occupied by the store one vector. As a result of this rotation of the vector, repersentative of a change in the remanent magnetization state of the readout film, a large value signal will be produced. This large signal is indicative of the fact that the value stored within the readout core is different from that which is being searched for and that a mismatch has occurred.

The signals produced as a result of the rotation of the remanent magnetization of the film 10 may be detected along each of the two coordinate axes as shown in FIGURES 3*a* and 3*b*. Firstly, the change of flux along the horizontal axis may be detected by suitbale means (not shown). As can be seen from FIGURE 3*a* the change in flux (considering the projections of the vectors 2 and 3 on the horizontal axis) has a component to the left in the figure. In FIGURE 3*b*, the component is to the right. As will be described below in reference to FIGURES 5*a* and 5*b* similar, but opposite polarity components will be detected. Thus the component for a stored one, with a search for zero (note FIG. 3*b*) will be equal in magnitude but opposite in polarity than the component for a stored zero, with a search for one field applied (note FIG. 5*a*). Thus, in the case of a search memory, when an entire word is being sought, if a complementary pair as described above existed, the components generated as a result of the two mismatches would cancel each other out, indicating a match whereas they were really two mismatches. Stated another way, when the incoming or word sought and the word stored differ in any multiple of two a match condition will be indicated. The time condition of the dual mismatch would be hidden.

A more reliable indication of a value stored as compared to the value sought is found by sensing the flux component along a line which is parallel with the word field that is, perpendicular to the direction of the easy axis of the films 10 and 12. Considering a projection of the vector positions 2 and 3 of FIGURE 3*a* on such a vertical axis there is a relatively small change between the positions projected on that axis of the head of vector 2 and the head of vector 3. As was indicated above under ideal conditions, this value approximates zero. Under actual conditions the value of the signal will be very low in the range of that of the noise signal present within the matrix itself and may be eliminated by certain discriminating circuitry. However, in the case shown in FIGURE 3*b* illustrating the condition for a one stored and a search for zero, it can be seen that the projection of the vector position 2 as the vector moves from its indicated position to a position substantially parallel with the vertical axis is constantly increasing in a positive direction and for that portion of the rotation from the vertical axis to the position shown in the figure as vector 3, the value decreases in a negative direction. As will be seen below from a discussion of the storage of a zero with searching for a one field applied the positive-negative pattern, just described, is characteristic of a mismatch, whether the value stored is a zero or one and the sought bit is a one or a zero, respectively. Thus, the signal may be used to indicate the mismatch condition without the possibility of cancelling the respective signals due to a complementary mismatch pair as would be present if the output signal was sensed along the horizontal axis of the vectors 14 and 16 as set forth above.

When the sensing operation has been completed and the external field caused by the pulsing of the word line and the bit lines have ceased, the only field operating upon the readout film 10, will be the field as generated by the memory film 12. As is evident from an inspection of FIGURE 2, the flux lines of this field will generally go in a direction anti-parallel to the arrowhead 8 of the readout core. This field will return the film 10 to its original remanent magnetization state as indicated by the vector 14 in FIGURE 2. Thus, without the necessity of any further external fields, the original value stored within the storage element is returned, to permit further sensing as required. Thus, it is evident that each of the memory elements may be sensed as desired without destroying the content of the information contained therein.

Referring now to FIGURE 4, there is shown an arrangement of the cores 10 and 12 for the storing of a zero value within the memory element. In the condition in which the memory element stores a zero, the memory vector 16 is caused to lie anti-parallel to the easy axis, as indicated by the arrow 6. The magnetization of the readout film 10 is made to lie along the easy axis in the direction as indicated by the arrow 8.

Referring now to FIGURES 5*a* and 5*b*, the vector representing the stored zero of the readout film 10 is shown as the horizontal vector 1 pointed towards the right of the drawing. Upon the application of a current pulse to the word line 20, the vector indicative of the remanent position of the film 10 is caused to rotate in a counterclockwise direction to take up a new position indicated as 2 in the FIGURES 5*a* and 5*b*. The value of the word field is shown as vertical in both of these figures. Upon the application of the subsequent current pulses to the bit line 18, the fields for the search one and the search zero condition are established.

It should be recalled that the bit fields are not applied simultaneously. It is rather a single bit field of either polarity which is applied. The application of both polarities of bit field to a single memory element is merely for illustrative purposes.

The condition for the search for one field is shown in FIGURE 5*a* whereas the condition for the search for zero is shown in FIGURE 5*b*. As was explained with reference to FIGURE 3*b* above, the application of the search for one field will cause the vector indicative of the magnetization of the film 10 to be rotated a great distance, thus changing the remanent magnetization of the film and causing a large value signal to be produced. On the other hand under the condition where a search for zero field is established, the vector indicative of the resultant remanent magnetization of the film RD will be changed a relatively small amount towards its original position indicative of the stored value zero. It should be noted at this time that the flux change was small in the condition in which the stored value was the same as the value being searched for, that is, in FIG. 3*a*, when a one was stored and a one was sought the value of the change of the vector position was small. Further, with respect to FIGS. 5*a* and 3*b* when the value stored and the value sought were not the same a large change in the position of the vector was detected with the accompanying large signal output. Thus, considering again the projections of the vector position 2 and 3 (FIGS. 5*a* and 5*b*) on the horizontal axis (if the sense line were arranged in the position parallel with the bit line), the change in flux for the condition shown in FIG. 5*a* would be in a direction to the left, which condition would be opposite to that indicated with respect to the FIG. 3*b* indicative of a disagreement between a stored one and a search for zero. Thus, as has been indicated above, under these conditions a detected signal would be cancelled upon the occurrence of a mismatch complementary pair in a matrix where an entire word was sought. However, when change in flux is sensed along a line which is in a direction perpendicular with the easy axis of the films 10 and 12 and the projections of the vectors 2 and 3 are made upon this vertical axis, it can be seen for a value stored of zero, when a value one is sought for, the change as the vector moves from its position indicated as 2 towards the vertical axis will be in an upward direction and when it moves from its vertical axis to the position indicated by the vector 3, it will be downward. This change is the same as the change discussed with reference to the FIG. 3*b*, wherein a one was stored and a zero was sought for. The changes under both conditions will be of the same polarity and of the same relative magnitude. In a similar fashion, when FIG. 5*b* is considered, a change in flux along the vertical line, considering the projections of the vectors 2 and 3 of a vertical axis are small and approximates zero.

Thus, it is evident from a consideration of FIGS. 3*a*, 3*b*, 5*a* and 5*b*, that one characteristic signal of a low level, approximating zero, will be produced as a result of the matching condition, between the signal stored and the signal sought for, whereas, a second large value signal will be achieved when the value sought for and the value stored do not agree and a mismatch has occurred. This signal will be of the same polarity for both conditions of mismatch and will thus be usable to indicate that a mismatch has occurred without the possibility of cancellation or complementary mismatches. Thus, if a common sense line, linking all of the bits of a given stored word was tested, the presence of a signal on this sense line would indicate that a mismatch existed between the word sought and the word stored whereas the absence of a signal on this line would indicate that a comparison or favorable match had occurred between the word sought and the word stored.

It should be recalled that the problem of cancellation is only important in a matrix application, where an entire word is sought. In the situation of a single memory element, cancellation could not occur and the output could conveniently be sensed along either axis. Next the nickel-iron film of appropriate thickness is electro-chemically deposited thereon. Below the substrate 2 is placed the sense line 22 in a direction parallel with the easy axis of the films 10 and 12. This is followed by the word line 20 also arranged in a direction parallel with the easy axis of the films. The final film is a bit line 18 placed in a direction transverse with the easy axis of the film. One grouping of each of these three films is placed below the substrate so as to effect the film 12 while a further group of the three windings is placed above the readout film 10 (but not shown in the drawing). The use of two conductors for each of the necessary functions permits convenient generation of the necessary magnetic fields. For example, the two conductor word input lines operate as a single transmission line providing a signal and a return path for the word current source. The fields thus created by the passage of current, will aid one another, creating a maximum value field at the memory and readout films located between said input line portions. The fields however, will tend to cancel one another out, outside of the area between the portions of the input line. Thus there will tend to be no field external to the individual memory element to adversely affect nearby elements. The same arrangements are provided for the bit and sense lines as well. In addition certain other field cancellation is provided for the sense line as will be set out below.

Several variations of this method may also be used such as a conducting ground plane in place of the bottom set of lines. It should be noted that in addition to the electrochemical depositing of the various films other methods such as vacuum depositing or chemical decomposition may be employed to deposit the films required.

Referring now to FIG. 7, there is illustrated a top or plan view of one embodiment. This embodiment is a matrix composed of memory elements constructed in accordance with the principles of this invention. Although only a 3 x 3 array is shown, i.e., a three-word memory having a word of three bits, it should be understood that the invention is not intended to be limited to this particular configuration. In fact by increasing the number of rows and columns it is possible to obtain a search memory having an arbitrary number of words and an arbitrary word length without departing from the scope of this invention. Further, by using a folded construction of the memory plane, as shown in the FIG. 8, it is possible to construct a three-dimensional array using the inventive concepts contained herein.

Memory films 12–1, 12–2 and 12–3 form the storage elements of a first word register; memory films 12–11, 12–12 and 12–13 form the storage element of a second word register; and memory films 12–21, 12–22 and 12–23 form the elements of a third register. Bit lines 18–1, 18–2 and 18–3 are provided to connect similar bit order positions of the three word registers, that is, the positions 12–1, 12–11 and 12–21, etc. In a similar manner, word lines are provided to connect each of the memory elements of a respective word register for example, 20–0 connects the elements 12–1, 12–2 and 12–3 which constitute the first word register. In a similar fashion, word lines 20–1 connects all of the memory elements of a second word register and 20–2 connects all of the memory elements of a third word register. Further, a sense winding 22–0 is employed to sense the values stored within the first word register whereas a sense winding 22–1 senses the values of the word register 2 and a further sense winding 22–2 senses the value of the third word register. The respective orientation of the various windings and of the preferred axis of each of the film pairs in the regions of inductive coupling therebetween is identical to that as shown in FIG. 1 as hereinbefore described.

If the word drive line (e.g. 20–0) and the sense line (e.g. 22–0) for each word register were arranged parallel to one another for their full lengths undesirable word coupling therebetween might occur. Therefore, some means must be provided to cancel any signals induced in the sense winding caused by the application of the drive field itself. To accomplish this, each segment of the respective sense lines between adjacent memory elements in a register such as segment 33 of the sense line 22–0 is made to resemble a squared "S" so that any signal induced in segment 34 by current on the line 20–0 is opposite to that induced in the leg 35 of the S-segment. With this winding configuration, any signal induced in the segment 34 of the winding 22–0 upon the application of a drive field by the winding 20–0 is cancelled by the signal induced in a segment 35 of the winding 22–0, providing the length of the segments 34 and 35 are substantially the same. The remaining segment sections 36 and 37 are far enough from the drive line 20–0 that any drive field due to the current in the line 20–0 does not induce any appreciable signal in either of these segments. Also, since segments 38, 39 and 40 are perpendicular to the axis of the drive line 20–0 they are not influenced to any appreciable extent by the application of a drive field to the winding 20–0. Each sense line in the matrix is arranged in a similar manner with respect to its associated word drive line. The manner of operation for each of the individual magnetic elements such as 12–1 is the same as that set forth with reference to FIGURES 1–5. The word sought for is established along the line 18–1, 18–2 and 18–3, simultaneously, producing longitudinal bit fields of a direction determined by the bit sought. For example, if one of the bits of the word sought is a one in a particular bit position, the field corresponding to the searched for one would be established. Correspondingly, if a zero exists in a position of the word sought the search for zero would be impressed upon that bit line. Fields corresponding to the digits of the word would thus be applied to the respective bit lines 18. Prior to the time in which the bit pulses were applied to the various lines 18 pulses would be applied to the lines 20–0, 20–1 and 20–2 to provide the required transverse word fields as the first step of the rotation of the stored vector position. As a result of the interaction of the values stored in the respective memory bits and the drive fields provided by the word and bit lines signals will be derived as explained with reference to FIGS. 3 and 5 and coupled to the sense lines 22–0, 22–1 and 22–2. For each position of mismatch along the respective sense lines a signal would be produced to indicate this. Thus, when reading at the lower end of the sense lines 22–0, 22–1 and 22–2, the presence of a signal anywhere at these points would indicate that a minumum of one mismatch had occurred. In that each of the mismatch conditions would produce the corresponding value of signal, the signal read at the output of the sense lines would be indicative of the number of mismatches which had occurred between the values sought and the values stored. In that no signal is provided when a match has occurred, the absence of a signal on the sense line, indicates that the register stored a value similar to that sought. It should be understood in the representation of the FIG. 8 that further readout core and drive lines for the word bit and sense functions would be deposited upon those shown in FIG. 8 in the manner such as described with reference to FIG. 1.

Referring now to FIGURES 8*a* and 8*b*, there is shown an atlernative arrangement for the device of FIG. 1 where the requirement for a transverse word field is removed. In other words, in the device of FIGURES 8*a* and8*b* it is possible to provide a non-destructive readout search memory employing only a bit field. Under these conditions, the bit field which acts upon the readout core 10 is made of sufficient magnitude to overcome the demagnetizing effects of the hard core or memory core 12 and to exceed the value of coercive force, necessary to cause the switching of the core 10 as well as certain marginal values to account for variances in the core device itself. The stated demagnetizing effect of the memory core 12 is the effect which tends to return the displaced vector such as that shown at position 2 in FIG. 3*a*, to the normal position as shown in the FIG. 2. Thus, with insufficient external force, the memory as explained above will retain the static conditions indicated. Thus, if the force applied by the bit line is sufficient to overcome this force as well as to overcome the critical value of coercive force $H_c$ of the material which composes the film 10 that is, the nickel-iron material the core 10 is caused to change its magnetic remanence state causing a large switching signal to be present. Again, this switching will only take place if the value stored is a one as indicated in FIG. 8*a* and the value searched for is a zero and is of sufficient magnitude to overcome the stated de-magnetizing effects and the critical value of the coercive force $H_c$ for the material of the readout core. The one search field would have no effect on the readout core and would attempt to force it further into its negative remanent condition. The value of the force, however, is insufficient to cause the switching of the memory core. Thus, if the value searched for and the value stored are the same, no signal will be generated. In FIG. 8*b*, there is a similar arrangement for the storage of a zero with the testing for a one and the testing for a zero condition. As was explained above, the value of the search for one is sufficiently great to overcome the magnetizing effects of the memory core 12 and the critical value of the coercive force of the material of the core RD, then the core RD will be forced to change its remanent state producing a large output signal. Similarly, if the value stored is a zero and a zero search is made the core will be forced further to its negative remanent condition and no switching will occur, thereby producing no discernible output signal. This device may also be arranged into a matrix similar to that shown in FIG. 7, however, without the necessity of providing a word line such as 20–0 in the device.

It should be noted that this embodiment employs the physical phenomena of domain wall motion rather than the rotation of the remanent magnetization as described above. In domain wall motion the longitudinal drive field $H_L$ (bit field) is applied in a direction anti-parallel to the remanent magnetization vector and aligned with the preferred axis of magnetization. The drive field $H_L$ applied above causes the domain boundaries between oppositely oriented domains to progressively move such that complete remagnetization results only when all the magnetization is aligned in a reversed direction. There is no domain rotational switching of the type described. The switching of the domain walls will result in a large signal output, whereas no switching results in a small or zero output value. Despite the difference in the phenomena involved the effective manner of operation will be the same for both types of switching.

While there has been set forth a discussion of the manner of reading out or sensing the information stored within the memory core of two-film magnetic elements it should be pointed out that information may be written into them merely by the coincidence of the transverse field created by the word line and the longitudinal bit field in conformance with the type of bit which is to be stored in the particular memory element.

It will be understood that various omissions and substitutions and change of form in the device illustrated and its operation may be made by those skilled in the art, without departing from the spirit of the invention.

The embodiments of the invention in which an exclusive property or privilege is claimed are defined as follows:

1. Apparatus comprising first and second magnetic films, each film having two stable remanent magnetic states and a preferred axis of remanent magnetization, said films being disposed adjacent one another with said axes parallel, and with said second film being susceptible to and having an antiparallel field applied to it by the remanent magnetization of said first film, means for applying a transverse field to said second film for displacing the remanent magnetization thereof, further means for applying a longitudinal field to said second film to further displace the remanent magnetization of said second film, and additional means to detect the change in flux of said second film as a result of said transverse and longitudinal fields.

2. Apparatus comprising first and second magnetic films, each film having two stable remanent magnetic states and a preferred axis of remanent magnetization, said films being disposed adjacent one another, with said axes parallel, and with said second film being susceptible to and having an antiparallel field applied to it by the remanent magnetization of said first film, first means for applying a transverse field to both said films but causing the displacement of the remanent magnetization of said second film only; second means for applying a horizontal field to both said films but causing the furthjer displacement of the remanent magnetization of said second film only and third means for detecting the change in flux of said second film as its remanent magnetization is displaced by said transverse and longitudinal fields.

3. An apparatus as claimed in claim 2, wherein the longitudinal field applied by said second means may be impressed in a direction parallel or antiparallel with said preferred axis of remanent magnetization of said second film.

4. Apparatus comprising first and second magnetic films, each film having two stable remanent magnetic states and a preferred axis of remanent magnetization, said films being disposed adjacent one another, with said axes parallel and with said second film being susceptible to and having an antiparallel field applied to it by the remanent magnetization of said first film, first means for placing said first film in a first of its stable remanent magnetic states and said second film in the second of its stable remanent magnetic states; second means for applying a field transverse to said preferred axis of remanent magnetization of said films thereby causing the displacement of the remanent magnetization of said second film; third means for applying a field longitudinal to said preferred axis of remanent magnetization to said films thereby causing the further displacement of the remanent magnetization of said second film; and fourth means to detect the change in flux caused by the displacement of said remanent magnetization of said second film.

5. Apparatus as claimed in claim 4, wherein the field applied to said second film by said first film will return said second film to its originally set condition upon the termination of said horizontal and longitudinal fields.

6. Apparatus comprising first and second magnetic films, each film having two stable remanent magnetic states and a preferred axis of remanent magnetization, said films being disposed adjacent one another, with said axes parallel, and said second film being susceptible to and having an antiparallel field applied to it by the remanent magnetization of said first film, first means for placing said first film in a first of its stable remanent magnetic states and said second film in the second of its stable remanent magnetic states to indicate the storage of a first type of information and for placing said first film in a second of its stable remanent magnetic states and second film in its first stable remanent magnetic state to indicate the storage of a second type of information; second means for applying a field transverse to said preferred axis of remanent magnetization of said films to displace said remanent magnetization of said second film in a direction parallel with said transverse field, third means for applying a field longitudinal to said preferred axis of remanent magnetization of said films in directions parallel or antiparallel to said preferred axis for displacing the remanent magnetization of said second film in a direction parallel to the original remanent magnetic state when said longitudinal field is parallel to said original remanent magnetic state and for displacing the remanent magnetization of said second film in a direction antiparallel to said original remanent magnetic state when said longitudinal field is antiparallel to said original remanent magnetic state of said second film; and fourth means to detect a large output signal when the remanent magnetization of said second film is displaced by said antiparallel longitudinal field and a small output signal when the remanent magnetization of said second film is displaced by said parallel longitudinal field.

7. Apparatus as claimed in claim 6, wherein the field applied to said second film by said first film will return said second film to said original remanent magnetic state upon the termination of said transverse and longitudinal fields.

8. Apparatus comprising first and second magnetic films, each film having two stable remanent magnetic states and a preferred axis of remanent magnetization, said films being disposed adjacent one another with said axes parallel, and with said second film being susceptible to and having an antiparallel field applied to it by the remanent magnetization of said first film; a first input line inductively coupled to said first and second films for applying a field transverse to said preferred axes of remanent magnetization; a second input line inductively coupled to said first and second films for applying a field longitudinal to said preferred axes of remanent magnetization and an output line inductively coupled to said first and second films for detecting changes in the remanent magnetization of said first and second films.

9. Apparatus as claimed in claim 8, wherein first means is provided to impress a current upon said first input line to develop said field; second means is provided to selectively impress a desired polarity current upon said second input line.

10. Apparatus comprising first and second magnetic films, each film having two stable remanent magnetic states and a preferred axis of remanent magnetization, said films being disposed adjacent one another with said axes parallel, and said second film being susceptible to and having an antiparallel field applied to it by the remanent magnetization of said first film; means for applying additional magnetic fields to said first and second films to displace the remanent magnetization of at least one of said films; and means for detecting changes in flux caused by the displacement of the remanent magnetization of said film.

11. Apparatus comprising first and second magnetic films, each film having two stable remanent magnetic states and a preferred axis of remanent magnetization, said films being disposed adjacent one another with said axes parallel, and said second film being susceptible to and having an antiparallel field applied to it by remanent magnetization of said first film; means for applying additional magnetic fields to said first and second films to displace the remanent magnetization of said second film; and means for detecting changes in flux caused by the displacement of the remanent magnetization of said second film.

12. Apparatus comprising first and second magnetic films each film having two stable remanent magnetic states and a preferred axis of remanent magnetization, said films being disposed adjacent one another with said axes parallel, and said second film being susceptible to and having an antiparallel field applied to it by the remanent magnetization of said first film; means for applying a field longitudinal to said preferred axes of remanent magnetization, of selected polarity to said first and second films to displace the remanent magnetization of said second film; and means for detecting changes in flux caused by the displacement of the remanent magnetization of said second film.

13. Apparatus comprising first and second magnetic films, each film having two stable remanent magnetic states and a preferred axis of remanent magnetization, said films being disposed adjacent one another with said axes parallel, and said second film being susceptible to and having an antiparallel field applied to it by the remanent magnetization of said first film; input lines inductively coupled to said first and second films for applying a field, longitudinal to said preferred axes of remanent magnetization, of selected polarity to said first and second films to displace the remanent magnetization of said second films; and output lines inductively coupled to said first and second films for detecting changes in flux caused by the displacement of the remanent magnetization of said second film.

14. Apparatus comprising first and second magnetic films, each film having two stable remanent magnetic states and a preferred axis of remanent magnetization, said films being disposed adjacent one another with said axes parallel and said second film being susceptible to and having an antiparallel field applied to it by the remanent magnetization of said first film; an input line mounted perpendicular ot said easy axis of remanent magnetization and inductively coupled to said first and second films for applying a field, longitudinal to said preferred axis of remanent magnetization of selected polarity, to said first and second films, to displace the remanent magnetization of said second film; and an output line mounted in parallel with said preferred axes and inductively coupled to said first and second films for detecting changes in flux caused by the displacement of the remanent magnetization of said second film.

15. Apparatus comprising first and second magnetic films, each film having two stable remanent magnetic states and a preferred axis of remanent magnetization, said films being disposed adjacent one another with said axes parallel, and with said second film being susceptible to and having an antiparallel field applied to it by the remanent magnetization of said first film; a first input line mounted in parallel with said preferred axes and inductively coupled to said first and second films for applying a field transverse to said preferred axes of remanent magnetization; a second input line mounted perpendicular to said preferred axes and inductively coupled to said first and second films for applying a field longitudinal to said preferred axes of remanent magnetization and an output line mounted in parallel with said preferred axes and inductively coupled to said first and second films for detecting changes in the remanent magnetization of said first and second films.

16. A memory matrix comprising a plurality of memory elements, each comprising first and second magnetic films, each film having two stable remanent magnetic states and a preferred axis of remanent magnetization, said films being disposed adjacent one another with said axes parallel and with said second film being susceptible to and having an antiparallel field applied to it by the remanent magnetization of said first film, said memory elements being arranged in a plurality of rows and columns, said matrix storing information in said rows and columns by predetermined magnetization settings of said first films in each memory element; a plurality of first means, one for each column, for applying a field transverse to said preferred axes of said first and second films of each memory element; a plurality of second means, one for each row, for selectively applying a first or second polarity field longitudinal to said preferred axes of said first and second films of each memory element in a particular row, the polarity of said longitudinal field being in accordance with the value of a multi-row comparison signal applied to said second means, and a plurality of third means, one for each column of said matrix for detecting agreement between the information stored in a particular column of said matrix and said multi-row comparison signal, said agreement being indicated by the absence of a signal at said third means.

17. A memory matrix comprising a plurality of memory elements, each comprising first and second magnetic films, each film having two stable remanent magnetic states and a preferred axis of remanent magnetization, said films being disposed adjacent one another with said axes parallel and with said second film being susceptible to and having an antiparallel field applied to it by the remanent magnetization of said first film, said memory elements being arranged in a plurality of rows and columns, said matrix storing information in said rows and columns by predetermined magnetization settings of said first films in each memory element; a plurality of first means, one for each memory element, to selectively place said memory elements in stable remanent magnetization states in accordance with the information to be stored; a plurality of second means, one for each column, for applying a field transverse to said preferred axis of said first and second films of each memory element, to cause the displacement of the remanent magnetization of one of said films; a plurality of third means, one for each row, for selectively applying a first or second polarity field longitudinal to said preferred axis of said first and second films of each memory element in a particular row, the polarity of said longitudinal fields being in accordance with the value of a multi-row comparison signal applied to said third means, to cause the further displacement of the remanent magnetization of one of said films, and a plurality of fourth means, one for each column of said matrix for detecting the change in the remanent magnetization of said one of said films and producing a signal indicative of agreement or disagreement between said multi-row comparison signal and information stored in a column of said matrix.

18. A matrix as claimed in claim 17 wherein the remanent magnetization of said second film is displaced.

19. A matrix as claimed in claim 18, wherein said second film is returned to its original condition of remanent magnetization by the field of said first film upon the cessation of signals upon said second and third means.

20. A memory matrix comprising a plurality of memory elements, each comprising first and second magnetic films, each film having two stable remanent magnetic states and a preferred axis of remanent magnetization, said films being disposed adjacent one another with said axes parallel and with second film being susceptible to and having an anti-parallel field applied to it by the remanent magnetization of said first film, said memory elements being arranged in a plurality of rows and columns, said matrix storing information in said rows and columns by predetermined magnetization settings of said first films in each memory element; a plurality of first means, one for each row, for selectively applying a first or second polarity field longitudinal to said preferred axes of said first and second films of each memory element in a particular row, the polarity of said longitudinal fields being in accordance with the value of a multi-row comparison signal applied to said first means, and a plurality of second means, one for each column of said matrix for detecting agreement between the information stored in a particular column of said matrix and said multi-row comparison signal, said agreement being indicated by the absence of a signal at said second means.

References Cited by the Examiner

UNITED STATES PATENTS

| | | | |
|---|---|---|---|
| 3,095,555 | 6/63 | Moore | 340—174 |

IRVING L. SRAGOW, *Primary Examiner.*